Dec. 23, 1947. S. SEGAL 2,433,298
COUPLING
Filed Dec. 3, 1945
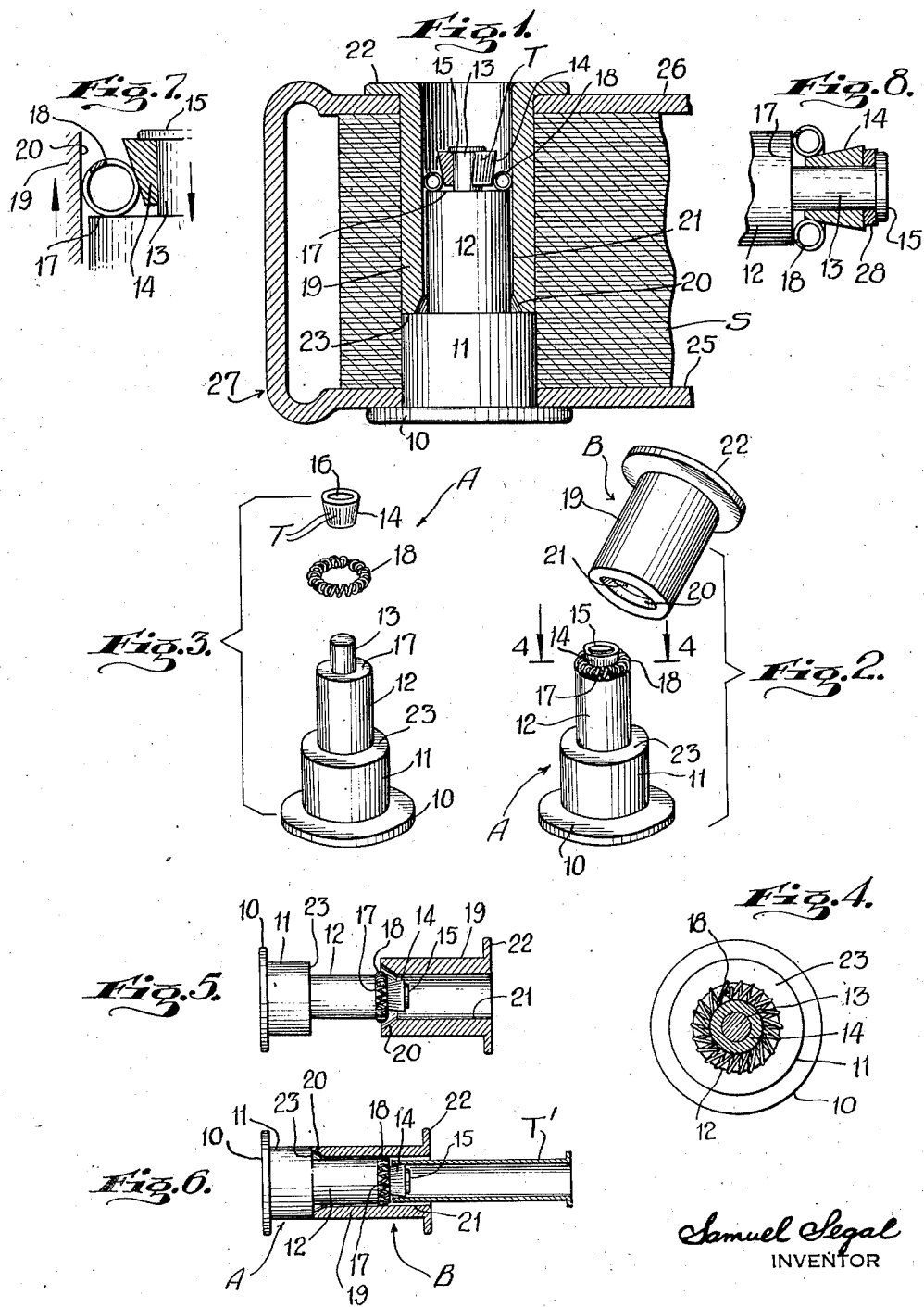
Samuel Segal
INVENTOR
BY
CM Palmer
ATTORNEY Patented Dec. 23, 1947

2,433,298

UNITED STATES PATENT OFFICE 2,433,298

COUPLING

Samuel Segal, New York, N. Y., assignor to Wilson-Jones Co., Chicago, Ill., a corporation of Massachusetts Application December 3, 1945, Serial No. 632,517

4 Claims. (Cl. 85—4)

This invention is a new and improved coupling. One object of the invention is realized in the provision of a self-locking coupling having complementary members adapted to be locked against separation upon telescoping of the members together. Another object resides in the provision of telescopically associated complementary members held against separation by a braking toroidal spring mounted on a frusto-conical rotatable member. Another object is concerned with providing a functional and structurally improved and simplified connector adapted to be quickly assembled and locked against separation by sliding one part thereof into a companion part and adapted to be separated or disconnected only upon the utilization of an instrumentality which is independent of the connector for overcoming the wedging action and resistance to separation offered by an expandible and contractible toroidal and coiled braking spring. Another important object of the invention resides in the provision of a serviceable self-locking connector or coupling wherein a primary member is provided with a tapered portion surrounded by a toroidal braking or wedging spring adapted to be received, contracted, and maintained contracted by a secondary member upon mounting the latter on the primary member to preclude separation of these members.

Other important and salient objects will appear from the following detailed description considered in the light of the accompanying drawings wherein:

Fig. 1 is a vertical sectional view of the self-locking coupling or connector in its assembled relation.

Fig. 2 shows in perspective the self-locking connector but with the complementary members thereof disconnected.

Fig. 3 is an exploded and perspective view of one of the complementary members of the coupling.

Fig. 4 is an enlarged sectional view on the line 4—4 of Fig. 2.

Fig. 5 illustrates the manner of initially telescoping the complementary members or sections of the coupling.

Fig. 6 illustrates the manner of separating or disconnecting the complementary members of the coupling after their assembly.

Fig. 7 is a fragmentary view illustrating the braking action by the toroidal spring in the attempt to separate or disconnect the complementary members, and Fig. 8 is a fragmentary view illustrating a slightly modified form.

The coupling or connector comprises the complementary primary and secondary members or sections A and B respectively.

Primary member or section A embodies the circular end flange 10, the reduced circular portion 11, the further reduced circular bearing or shank 12 and the circular and still further reduced portion or stem 13. Portions 11, 12 and 13 are axially or concentrically arranged relative to the hub or end flange 10.

Forming a part of section A and rotatably mounted and slidably guided on shank or stem 13 thereof is the frusto-conical exteriorly toothed or serrated annular tapered member 14 which is retained on the stem 13 by upsetting the free end of the latter to provide the circular head or flange 15.

The bore 16 of the tapered or frusto-conical member 14 closely, rotatably and slidably surrounds the circular exterior surface of the stem 13. In length or height, stem 13 is longer than the rotatable toothed member 14 and thus the latter may be also slidably displaced along the stem 13 between the end flange or stop 15 and the annular stop face 17. Hence it may be said that the frusto-conical member floats on the stem 13.

Closely surrounding the restricted end of the tapered or frusto-conical member or float 14 and also forming a part of the complementary member or primary section A is the toroidal or annular endless expandible and contractible spring 18 formed by a plurality of coils which normally tend to urge float 14 against the rim or stop 15. Or stated in another way, float 14 is seated on the toroidal spring which normally slidably urges float 14 to yieldingly bear against the stop 15.

Normally the toroidal spring 18 is rotatably disposed adjacent the annular face 17 and its coils are normally expanded extending slightly beyond shank or cylindrical reduced portion 12. However, spring 18 snugly embraces the tapered float 14 and is bodily rotatable therewith due to the interlocking relation of the coils thereof with the teeth or serrations T on the exterior surface of the tapered float 14.

The complementary member broadly denoted B is a bushing having an annular thimble or shell 19 provided with the inwardly contracted or beveled mouth 20 leading to the uninterrupted bore 21. Integral with the shell is annular flange or rim 22 which may be considered as a manipulating member in the matter of assembling the complementary members A and B together to characterize the coupling or connector.

As shown in Fig. 2, members A and B are disconnected. To connect these parts, the serrated and rotatable and slidable float 14 is first placed into or positioned in the tapered mouth 20 of the shell 19 and the toroidal spring 18 is caused to contract slightly about the float 14. Now by applying an inwardly directed thrust on the hubs or flanges 10 and 22, spring 18 now contracted snaps into bore 21 whereby shell 19 may be moved over the cylindrical shank or portion 12 until the end of the shell meets the stop shoulder 23. While the shell 19 may be moved towards and against the shoulder 23 it cannot at any time be retracted upon pulling the bearing or bushing B in a direction away from the reduced stem or shank 12 due to the braking action of the toroidal spring on the float 14 and on the shell 19. Such braking action is caused by the shell 19 wedging the toroidal spring 18 against the tapered and toothed float 14, thus creating a braking force by the spring 18 on the shell 19, preventing the latter's outward displacement, that is, in a direction away from annular shoulder 23.

With the complementary members or primary and secondary sections A and B coupled together as illustrated in Figs. 1 or 6, these members may be rotated relative to each other on the bearing or shank 12 but they cannot be accidentally disconnected or separated from each other. However, separation is possible when it is particularly desired. To this end a tube $T^1$ may be employed and placed within shell 19 of the bushing B and over float 14 and against the spring 18 (Fig. 6) to force the latter through and out of the bore 21. By forcing the tube $T^1$ against the spring, the frictional pressure or resistance created by the latter against the bore 21 is overcome and hence the spring may be disengaged or disconnected from shell 19.

By merely telescoping complementary members A and B these may be quickly coupled or connected together. When so connected, their assembly may serve as fastening means removably associated with a pair of cover members 25 and 26 (Fig. 1) of a record book 27 holding a stack of sheets S. Or when assembled, parts or members A and B may be considered as a spool or reel for holding a supply of motion picture film (not shown). The connector may be also used as a bearing or suitable thrust take up means. And if desired a suitable washer 28 (Fig. 8) may be mounted on the cylindrical stem 13 between the float 14 and the stop 15 to take up laterally directed thrusts imparted to the float. While certain uses and applications have been set out herein for purposes of specification, the connector or coupling of course is not limited to such use or application only as other uses may be made of the connector herein disclosed.

Of course in the assembled relation of the primary and secondary members A and B, the toroidal spring is held or maintained contracted by the wall of the bore 21 which in a sense is more contracted or reduced than the tapered mouth 20. In the bore 21 the toroidal spring cannot expand and bears frictionally against the circular wall thereof.

Various changes may be made in details of construction and arrangement of parts without departing from the spirit of the invention or sacrificing any of the advantages thereof inherent therein.

I claim:

1. A coupling comprising a primary member having an end flange, a cylindrical portion reduced relatively to said flange, a cylindrical shank concentrically projecting from said reduced portion and defining therewith an annular stop shoulder, a cylindrical stem concentrically extending from said shank and reduced relatively thereto and defining therewith an annular stop face and having terminal stop means, frusto-conical tubular means rotatably and slidably mounted on said stem between said stop face and terminal stop means, toroidal and helicoidal spring means surrounding and engaging said tubular means and normally disposed contiguous to said stop face and adapted to extend outwardly and slightly beyond the latter, a secondary member disconnectably mounted on said primary member and constituting a hollow cylindrical bushing having an inwardly converging mouth for receiving and contracting said spring means and embodying a concentrically disposed bore for receiving and maintaining said spring means contracted and for slidably and rotatably receiving said shank and having an end portion cooperating with said annular stop shoulder to limit linear displacement of said secondary member on said shank, said spring means in the contracted relation thereof wedgeably and removably bearing against the wall of said bore to prevent slidable separation of said primary and secondary members, and a flange at the outer end of said bushing.

2. A coupling comprising; a primary member having an end flange, a cylindrical portion reduced relative to said flange, a cylindrical shank concentrically projecting from said reduced portion and defining therewith an annular stop shoulder, a cylindrical stem concentrically extending from said shank and reduced relatively thereto and defining therewith an annular stop face and having terminal stop means, frusto-conical tubular means rotatably and slidably mounted on said stem between said stop face and terminal stop means, toroidal and helicoidal spring means surrounding and engaging the contracted end of said tubular means and normally disposed contiguous to said stop face and adapted to extend slightly beyond the latter, a secondary member disconnectably mounted on said primary member and constituting a hollow cylindrical bushing having an inwardly converging mouth for receiving and contracting said spring means and embodying a concentrically disposed bore for receiving and maintaining said spring means contracted and for rotatably and slidably receiving said shank and having an end portion cooperating with said annular stop shoulder to limit linear displacement of said secondary member on said shank, said spring means in the contracted relation thereof wedgeably and removably bearing against the wall of said bore to prevent slidable separation of said primary and secondary members, and a flange at the outer end of said bushing.

3. A coupling comprising; a primary member having an annular end flange, a cylindrical portion reduced relative to said flange, a cylindrical shank concentrically projecting from said reduced portion and defining therewith an annular stop shoulder, a cylindrical stem concentrically extending from said shank and reduced relatively thereto and defining therewith an annular stop face and having terminal stop means, frusto-conical tubular means rotatably and slidably mounted on said stem between said stop face and terminal stop means, toroidal and helicoidal spring means surrounding and engaging the contracted end of said tubular means and normally disposed contiguous to said stop face and adapted to extend slightly beyond the latter, toothed means extending lengthwise of said tubular means and interlocking with said spring means, a secondary member disconnectably mounted on said primary member and constituting a hollow cylindrical bushing having an inwardly converging mouth for receiving and contracting said spring means and embodying a concentrically disposed bore for receiving and maintaining said spring means contracted and for rotatably and slidably receiving said shank and having an end portion cooperating with said annular stop shoulder to limit linear displacement of said secondary member on said shank, said spring means in the contracted relation thereof wedgeably and removably bearing against the wall of said bore to prevent slidable separation of said primary and secondary members, and an annular flange at the outer end of said bushing.

4. A coupling comprising; a primary member having an annular end flange, a cylindrical portion reduced relative to said flange, a cylindrical shank concentrically projecting from said reduced portion and defining therewith an annular stop shoulder; a cylindrical stem concentrically extending from said shank and reduced relatively thereto and defining therewith an annular stop face and having terminal stop means, frusto-conical tubular means rotatably and slidably mounted on said stem between said stop face and terminal stop means, toroidal and helicoidal spring means surrounding and engaging said tubular means and normally disposed contiguous to said stop face and adapted to extend outwardly and slightly beyond the latter, a secondary member disconnectably mounted on said primary member and comprising a hollow cylindrical shell having an inwardly converging mouth for receiving and contracting said spring means and embodying a concentrically disposed bore for receiving and maintaining said spring means contracted and for rotatably and slidably receiving said shank and having an end portion cooperating with said annular stop shoulder to limit linear displacement of said secondary member on said shank, said spring means in the contracted relation thereof wedgeably and removably bearing against the wall of said bore to prevent slidable separation of said primary and secondary members, and an annular flange at the outer end of said shell, said shell and first mentioned cylindrical portion being rotatable relative to each when said spring means is engaging the wall of said bore and constitute with said annular flanges a spool.

SAMUEL SEGAL.

REFERENCES CITED

The following references are of record in the file of this patent:

UNITED STATES PATENTS

| Number | Name | Date |
|---|---|---|
| 759,410 | Berg | May 10, 1904 |
| 809,496 | Cleveland | Jan. 9, 1906 |
| 1,418,329 | Schade | June 6, 1922 |
| 2,091,880 | Reichenbach | Aug. 21, 1937 |